(12) United States Patent
Qi et al.

(10) Patent No.: US 8,605,232 B2
(45) Date of Patent: Dec. 10, 2013

(54) DISPLAY BACKLIGHT HAVING LIGHT GUIDE PLATE WITH LIGHT SOURCE HOLES AND DUAL SOURCE PACKAGES

(75) Inventors: Jun Qi, Cupertino, CA (US); Bryan W. Posner, La Selva Beach, CA (US); Dinesh C. Mathew, Fremont, CA (US); Adam T. Garelli, Santa Clara, CA (US); Victor H. Yin, Cupertino, CA (US); Keith J. Hendren, Capitola, CA (US); Laura M. DeForest, Sunnyvale, CA (US); Peteris K. Augenbergs, San Francisco, CA (US); Thomas W. Wilson, Jr., Saratoga, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 13/008,300

(22) Filed: Jan. 18, 2011

(65) Prior Publication Data
US 2012/0182497 A1    Jul. 19, 2012

(51) Int. Cl.
*G02F 1/1335* (2006.01)

(52) U.S. Cl.
USPC .......... 349/62; 349/65; 349/67; 362/609; 362/612

(58) Field of Classification Search
USPC .......................................... 362/628, 630
See application file for complete search history.

(56) References Cited

U.S. PATENT DOCUMENTS

| | | | |
|---|---|---|---|
| 7,156,538 B2* | 1/2007 | Han et al. | 362/249.06 |
| 7,425,729 B2 | 9/2008 | Yun et al. | |
| 7,641,376 B2* | 1/2010 | Sakai et al. | 362/623 |
| 8,068,186 B2* | 11/2011 | Aufderheide et al. | 349/12 |
| 2008/0101093 A1* | 5/2008 | Yoon et al. | 362/630 |
| 2008/0266900 A1 | 10/2008 | Harbers et al. | |
| 2008/0278661 A1* | 11/2008 | Oh | 349/65 |
| 2009/0045420 A1* | 2/2009 | Eng et al. | 257/98 |
| 2009/0046479 A1 | 2/2009 | Bierhuizen et al. | |
| 2009/0066877 A1* | 3/2009 | Abe et al. | 349/62 |
| 2009/0185362 A1* | 7/2009 | Hong et al. | 362/97.1 |
| 2010/0231837 A1* | 9/2010 | Harada et al. | 349/122 |
| 2010/0252846 A1 | 10/2010 | Bierhuizen et al. | |
| 2010/0265696 A1* | 10/2010 | Ho | 362/97.3 |
| 2010/0277670 A1* | 11/2010 | Hamada | 349/62 |

\* cited by examiner

*Primary Examiner* — Bumsuk Won
*Assistant Examiner* — Ryan Crockett
(74) *Attorney, Agent, or Firm* — Fletcher Yoder PC

(57) ABSTRACT

A display may include a backlight structure. The backlight structure may include a light guide plate. Holes in the light guide plate may be configured to receive corresponding light-emitting diodes. The holes may separate an edge portion of the light guide plate from a main central portion of the light guide plate. Adhesive may be attached to the lower surface of the edge portion. The adhesive may be attached to a device housing or may be attached to a flex circuit that is attached to the housing with additional adhesive. The light-emitting diodes may be mounted within packages in pairs. The packages may be mounted on the flex circuit. Traces on part of the flex circuit may be covered by part of the light guide plate without any intervening adhesive. A reflective structure may be interposed between the traces and parts of the main portion of the light guide plate.

22 Claims, 13 Drawing Sheets

DISPLAY BACKLIGHT HAVING LIGHT GUIDE PLATE WITH LIGHT SOURCE HOLES AND DUAL SOURCE PACKAGES

BACKGROUND

This relates to electronic devices with displays, and more particularly, to backlight structures for displays.

Electronic devices such as computers and other electronic equipment often use backlit displays. A typical backlight structure may include light-emitting diodes that launch light into the edge of a plastic light guide plate. As light travels within the light guide plate, some of the light is scattered through the surface of the plate and serves as backlight for overlapping display structures.

In some displays, the edge of the light guide plate is serrated to accommodate a row of light-emitting diodes. A bezel structure may be used to help hold the components in a display of this type such as the light guide plate and other backlight structures in position within an electronic device.

It may be desirable to form a groove in a housing to help retain the backlight and other display structures within the housing without using bezel structures. With this type of arrangement, one edge of the light guide plate may be retained within the groove and another edge of the light guide plate may be held in place using adhesive. The use of this type of arrangement may help minimize the size of the device, but the presence of the adhesive under the light guide plate may affect the quality of the backlight that is produced.

It would therefore be desirable to be able to provide improved arrangements for backlighting displays for electronic devices.

SUMMARY

An electronic device may include a display such as a liquid crystal display. The display may include display structures such as a thin-film transistor layer and a color filter layer. Liquid crystal material may be interposed between the thin-film transistor layer and the color filter layer. Polarizer layers and other optical films may be included in the display structures. An array of electrodes associated with the thin-film transistor layer may be used to produce an image in the display structures.

The display may include a backlight structure. The backlight structure may include a light guide plate. Holes in the light guide plate may be configured to receive corresponding light-emitting diodes. The holes may be rectangular and may have four edges or may have other suitable shapes to receive light-emitting diodes packaged within non-rectangular packages. Portions of the light guide plate may surround the edges of each hole. The holes may separate an edge portion of the light guide plate that is located along a peripheral region of the light guide plate from a main central portion of the light guide plate.

Adhesive may be attached to the lower surface of the edge portion of the light guide plate. The adhesive may be attached to a device housing or may be attached to a flex circuit that is attached to the housing with additional adhesive.

The light-emitting diodes may be mounted within packages in pairs. The packages may be mounted in a row on the flex circuit. Traces on part of the flex circuit may be covered by part of the central portion of the light guide plate without any intervening adhesive. A reflective structure may be interposed between the traces and overlapping parts of the main central portion of the light guide plate.

Further features of the invention, its nature and various advantages will be more apparent from the accompanying drawings and the following detailed description of the preferred embodiments.

DETAILED DESCRIPTION

Displays with backlight structures may be incorporated into electronic devices. Backlight structures allow displays to be used in a variety of lighting conditions.

Figure 1:
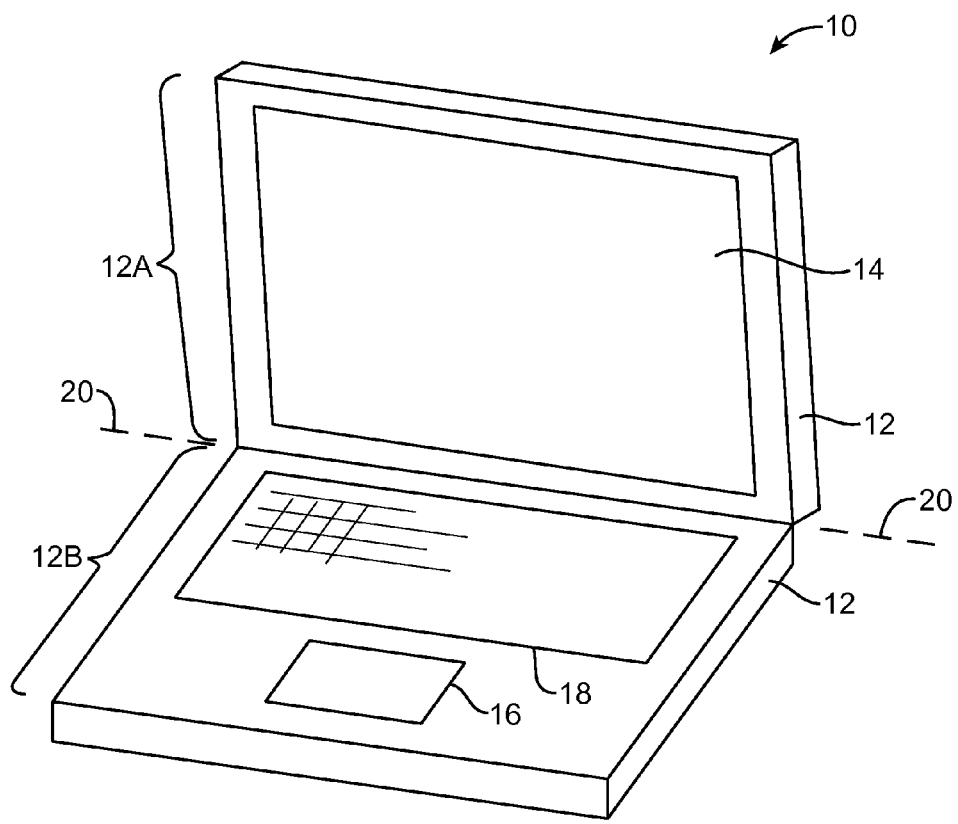
FIG. 1 is a perspective view of an illustrative electronic device having display backlight structures in accordance with an embodiment of the present invention.

An illustrative electronic device that may be provided with a backlit display is shown in FIG. 1. Electronic devices such as illustrative electronic device 10 of FIG. 1 may be laptop computers, tablet computers, cellular telephones, media players, other handheld and portable electronic devices, smaller devices such as wrist-watch devices, pendant devices, headphone and earpiece devices, other wearable and miniature devices, or other electronic equipment.

As shown in FIG. 1, device 10 may have a housing such as housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures). In the illustrative configuration of FIG. 1, device housing 12 has an upper portion (display housing 12A) and a lower portion (base housing 12B) that are coupled using hinge structures. The hinge structures allow rotational movement of housing structures 12A and 12B relative to each other about rotational axis 20. If desired, device housing 12 may omit the hinge structures (e.g., when forming a handheld device or tablet device). The hinged housing arrangement of FIG. 1 is merely an example.

Device 10 may have one or more displays such as display 14. Display 14 may, for example, be a touch screen that incorporates capacitive touch electrodes. Display 14 may include image pixels formed from liquid crystal display (LCD) components or other suitable image pixel structures. A cover glass member may cover the surface of display 14. The cover glass member may be formed from clear plastic, glass, or other transparent materials. If desired, the cover glass may be omitted and other structures in display 14 such as a polarizer layer or a color filter array layer may serve as the outermost layer of display 14.

Openings in housing 12 may be used to form input-output ports, microphone ports, speaker ports, button openings, media ports, etc. Input-output components such as touch pad 16 and keyboard 18 may, if desired, be mounted within housing 12.

Figure 2:
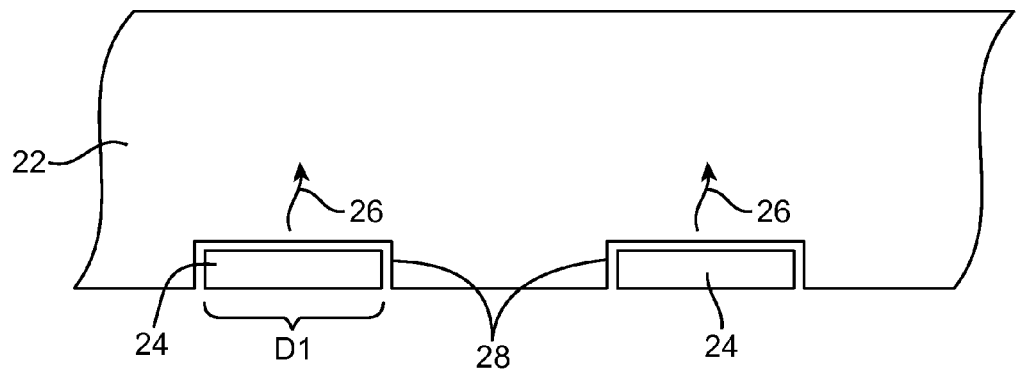
FIG. 2 is a top view of a conventional light guide plate and associated light-emitting diodes.

To provide a display with backlight, conventional backlight structures are provided with light-emitting diodes that emit light into the edge of a light guide plate. A conventional backlight arrangement of this type is shown in FIG. 2. As shown in FIG. 2, light guide plate 22 may have a series of notches such as notches 28 along one of its edges that receive light-emitting diodes 24. Light guide plate 22 may be formed from clear plastic. Light-emitting diodes 24 may be mounted on a strip of flexible printed circuit ("flex circuit") material.

Figure 3:
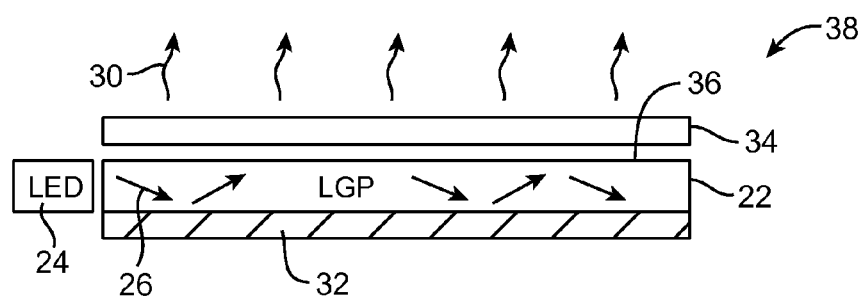
FIG. 3 is a side view of a conventional display having a light guide plate and light-emitting diodes of the type shown in FIG. 2.

During operation, light-emitting diodes 24 each emit light 26 into light guide plate 22, as shown in FIG. 2. As shown in the cross-sectional side view of conventional display 38 FIG. 3, light 26 tends to travel within the light guide plate due to total internal reflection. Some of light 26 escapes through the lower surface of light guide plate 22 and is redirected upwards by reflector 32. Other light 26 escapes directly through upper surface 36 of light guide plate 22. The light that has escaped from light guide plate 22 travels outwardly through display structures 34 as shown by light rays 30 in FIG. 3. Display structures 34 may be liquid crystal display structures that create an array of colored image pixels for display 38.

Figure 4:
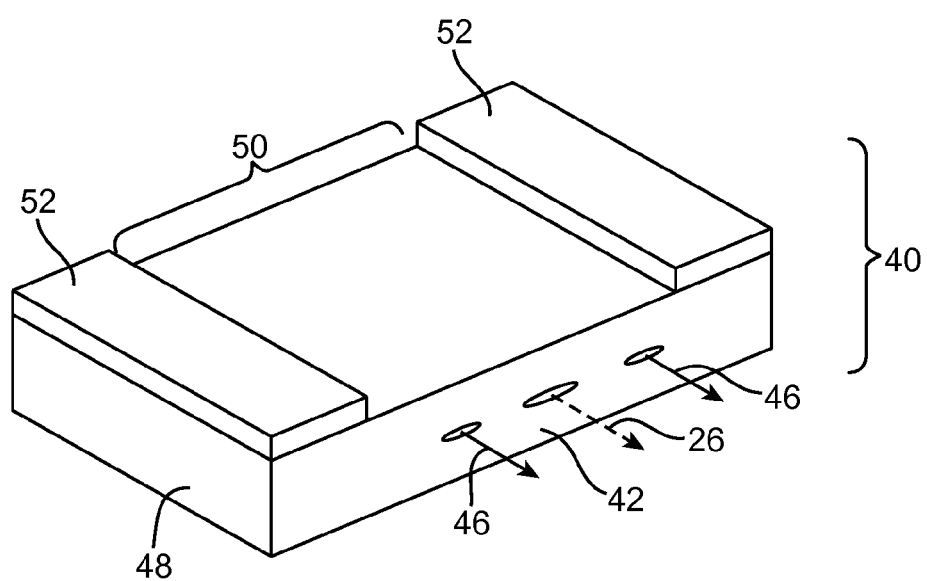
FIG. 4 is a perspective view of a package of the type that may be used in housing light source structures such as light-emitting diodes in accordance with an embodiment of the present invention.

In creating backlight for display 14 of device 10, it may be desirable to mount multiple light emitting diodes within a single package. An illustrative light-emitting diode package is shown in FIG. 4. As shown in FIG. 4, light-emitting diode package 40 may have conductive terminals 52. Terminals 52 may include a positive terminal and a negative terminal at opposing ends of package structure 48. When power is applied to terminals 52, current flows through the light-emitting diode structures within package 40 and light is emitted.

As shown in FIG. 4, central portion 50 of package structure 48 may be free of terminal structures. Structure 48 may be formed from a non-conducting material (e.g., polymeric material) so that current does not flow between terminals 52 along the surface of package 48, but rather flows through the light-emitting diode structures that are packaged within package structure 48.

Terminals 52 may be formed from metal or other suitable conductive materials. Package structure 48 and terminals 52 may, if desired, be configured to allow light-emitting diode package 40 to be mounted to a printed circuit board using solder (e.g., solder that electrically and mechanically connects each of terminals 52 to a corresponding conductive trace such as a pad-shaped portion of a trace on a printed circuit). A tool such as a surface mount technology (SMT) mounting tool may be used in attaching package 40 to the printed circuit substrate or other suitable substrate (i.e., package 40 may be an SMT package).

In conventional SMT light-emitting diode structures, light is emitted from a single embedded light-emitting diode, as illustrated by dashed line 26 of FIG. 4. In embodiments of the backlight used in display 14 of FIG. 1, one or more, two or more, or three or more light-emitting diodes may be mounted within a package such as SMT light-emitting diode package 40. In a configuration in which there are two light-emitting diodes contained within package structure 48, light may be emitted from package 40 at two locations along edge 42 of package 40, as illustrated by lines 46 in FIG. 4.

In a typical arrangement, terminals 52 are mounted face down on a printed circuit or other substrate. In the perspective view of FIG. 4, package 40 is shown from the bottom to avoid obscuring terminals 52.

Figure 5:
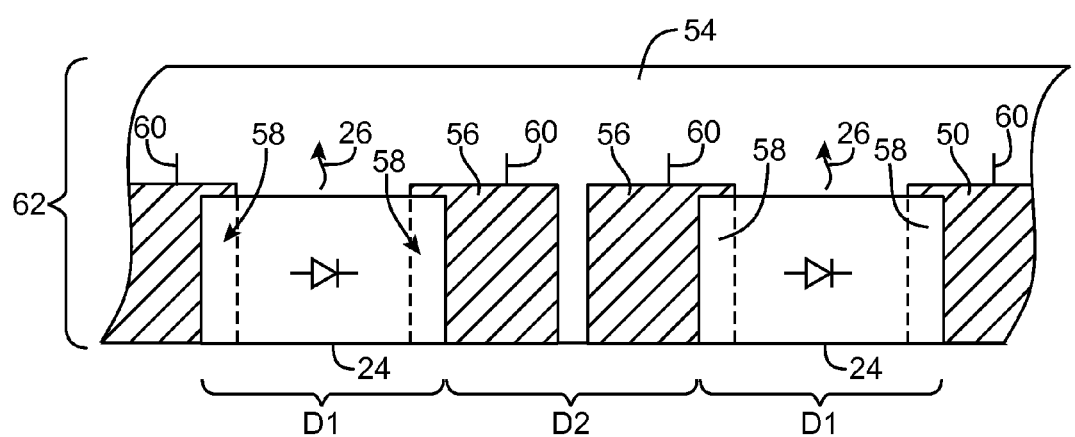
FIG. 5 is a top view of a conventional printed circuit on which conventional light-emitting diodes for illuminating a light guide plate in a backlight structure have been mounted.

A conventional printed circuit on which conventional light-emitting diodes 24 have been mounted is shown in FIG. 5. Printed circuit structures 62 include flexible printed circuit substrate 54. Conductive traces are formed on substrate 54 such as traces 60 and traces 56. These traces and extensions to traces 60 that run along the length of substrate 54 are used to distribute power to the conductive terminals of light-emitting diodes 24. The terminals of diodes 24 are located at the left and right ends of each diode 24 under regions 58. Solder is used to connect the diode terminals to pad-shaped trace portions 56. In one configuration, the length D1 of each diode 24 is about 2.8 mm and the length D2 of the gap between each adjacent pair of diodes 24 is about 2.6 mm.

Figure 6:
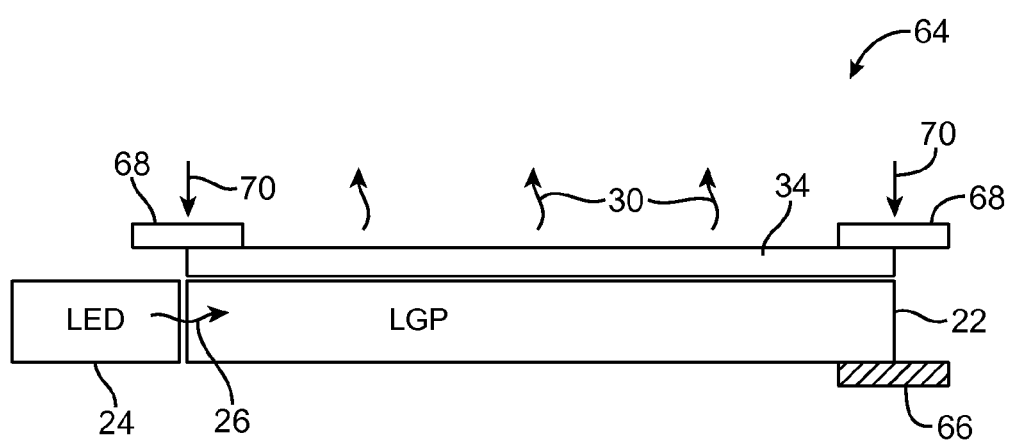
FIG. 6 is a side view of a conventional display that has been mounted within an electronic device using display bezel structures.

A side view of a conventional liquid crystal display that is illuminated using light-emitting diode structures of the type shown in FIG. 5 is shown in FIG. 6. With the conventional display arrangement of FIG. 6, display 64 has edge mounted light-emitting diodes 24 that emit light 26 into the edge of light guide plate 22 as described in connection with FIG. 2. Light-emitting diodes 24 are mounted to a printed circuit substrate of the type shown in FIG. 5. During operation of display 64, backlight from light guide plate 22 may be scattered upwards through liquid crystal display (LCD) structures 34, as shown by light rays 30. Adhesive 66 may help attach the display structures of FIG. 6 to a device housing. Bezel structures 68 may surround the periphery of display 64 and may press display structures 34 and 22 downwards in direction 70, thereby securing display 64 within the electronic device in which display 64 is used.

Figure 7:
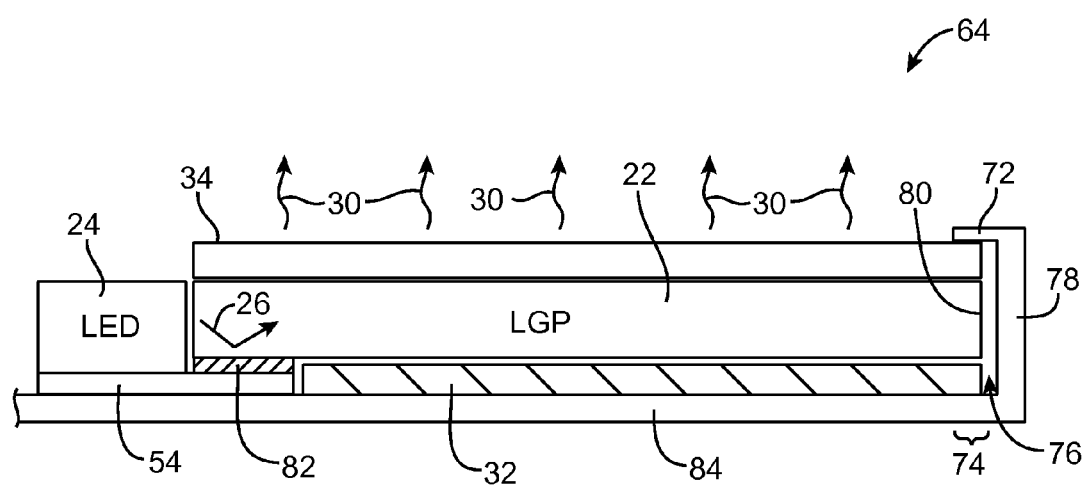
FIG. 7 is a side view of a conventional display that has been mounted within an electronic device using a housing groove and adhesive.

Conventional arrangements of the type shown in FIG. 6 require the use of display bezel 68. In compact devices and devices were a display bezel is not desired for aesthetic reasons, it may be preferable to mount display 64 without using a display bezel. A conventional configuration in which display 64 has been mounted without using a display bezel is shown in FIG. 7. As shown in FIG. 7, display 64 has been mounted within device housing 84. Housing 84 has an end portion 78 that is separated from end 80 of light guide plate 22 by gap 76 to accommodate flexing of light guide plate 22 during use of display 64. Lip portion 72 overhangs end 80 and forms a groove (groove 74) in housing 84 that helps retain the right-hand edge portion of display (e.g., light guide plate 22, display structures 34, and reflector 32) within housing 84. The left-hand portion of display 64 is attached to housing 84 using adhesive 82. In particular, adhesive 82 holds the left-hand edge of light guide plate 22 to flex circuit 54 (on which light-emitting diodes 24 are mounted). Flex circuit 54 is attached to housing 84, so attachment of light guide plate 22 to flex circuit 54 holds light guide plate 22 to housing 84.

By using adhesive 82 and housing groove 74, the use of display bezel 68 (FIG. 6) can be avoided when mounting display 64 within a device. However, the presence of adhesive 82 can cause visible artifacts in the backlight 30 that is being emitted through the surface of display 64. This is because adhesive 82 typically includes bubbles and other imperfections that can affect light 26 as light 26 reflects from the lower surface of light guide plate in the vicinity of adhesive 82.

Figure 8:
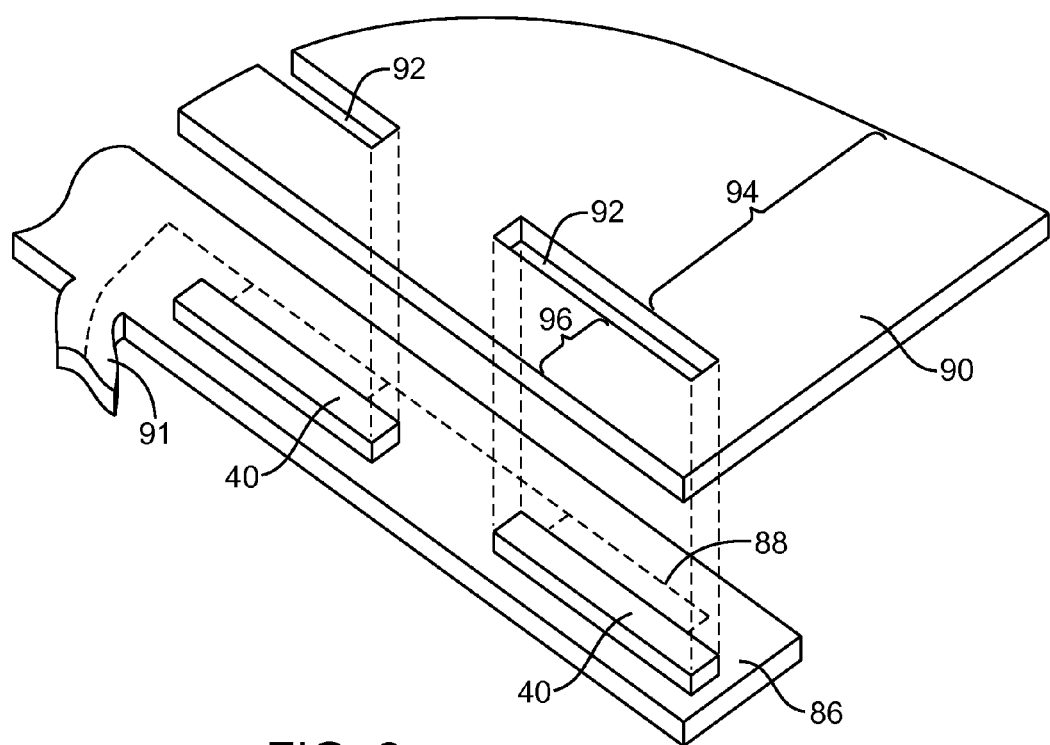
FIG. 8 is a perspective view of a light guide plate with holes to accommodate light-emitting diodes in accordance with an embodiment of the present invention.

FIG. 8 is an exploded perspective view of backlight structures that may be used in a display such as display 14 of electronic device 10 of FIG. 1. The backlight structures of FIG. 8 include a light guide plate such as light guide plate 90 and light sources such as packaged light-emitting diodes 40. Light guide plate 90 may have a row of holes 92 that extends parallel to one of the edges of light guide plate 90. Each hole 92 may separate an edge portion of light guide plate 90 such as edge portion 96 on the outer side of holes 92 near the periphery of light guide plate from main portion 94 of light guide plate 90 on the inner side of holes 92 near the center of light guide plate 90. In this configuration, holes 92 are surrounded on all four sides by portions of light guide plate 90 so that each hole 92 is enclosed and surrounded by light guide plate material. Light guide plate 90 may be formed from a sheet of clear acrylic or other transparent polymer and may have a thickness of about 0.1 to 1 mm (as an example). The outline of light guide plate 90 may match that of display 14.

Holes 92 may have any suitable shape that accommodates light-emitting diode packages 40 when light-emitting diode packages 40 are mounted to light guide plate 90. In the example of FIG. 8, light-emitting diode packages 40 have elongated rectangular shapes (e.g., using SMT package structures of the type shown in FIG. 4). In this type of configuration, holes 92 may be rectangular and may be sized to mate with the outlines of diode packages 40. In general, light-emitting diodes 40 may be packaged within any suitable packages (e.g., packages with circular outlines, cylindrical packages, packages with combinations of planar portions and curved portions, packages with outlines having both curved and straight edges, etc.). The example of FIG. 8 in which rectangular hole shapes are used to receive rectangular light-emitting diode packages is merely illustrative. Different hole (opening) shapes that allow light-emitting diodes 40 in non-rectangular packages to be received within the plane of light guide plate 40 may be used if desired.

As shown in FIG. 8, light-emitting diode packages 40 may be mounted in a row along a substrate such as substrate 86. In this type of configuration, light-emitting diode packages 40 may sometimes be referred to as forming a light-emitting diode array. One or more edges of display 14 may be provided with such light-emitting diode arrays to provide backlight for the display. Illustrative configurations in which the left-hand edge of display 14 (in the orientation showing in the drawings) has been provided with an array of light-emitting diode packages 40 are sometimes described as an example.

Light-emitting diode array substrate 86 may be a rigid printed circuit board formed from material such as fiberglass-filled epoxy (e.g., FR4), may be flexible printed circuit ("flex circuit") formed from a flexible sheet of polymer such as a layer of polyimide, may be a ceramic substrate, a plastic substrate, a glass substrate, etc. Conductive traces may be formed on and/or within substrate 86 (e.g., using copper or other metals). These conductive traces, which are shown schematically as traces 88 in FIG. 8) may have the shape of pads (see, e.g. pads 56 of FIG. 5) and may help dissipate heat from packaged light-emitting diodes 40. Each light-emitting diode package 40 on substrate 86 may have a pair of terminals 52 as shown in FIG. 4. These terminals may be soldered to traces 88. During operation, power may be provided to the light emitting diodes via traces 88. Tail portion 91 of substrate 86 may be used to interconnect traces 88 to a source of power in electronic device 10.

Figure 9:
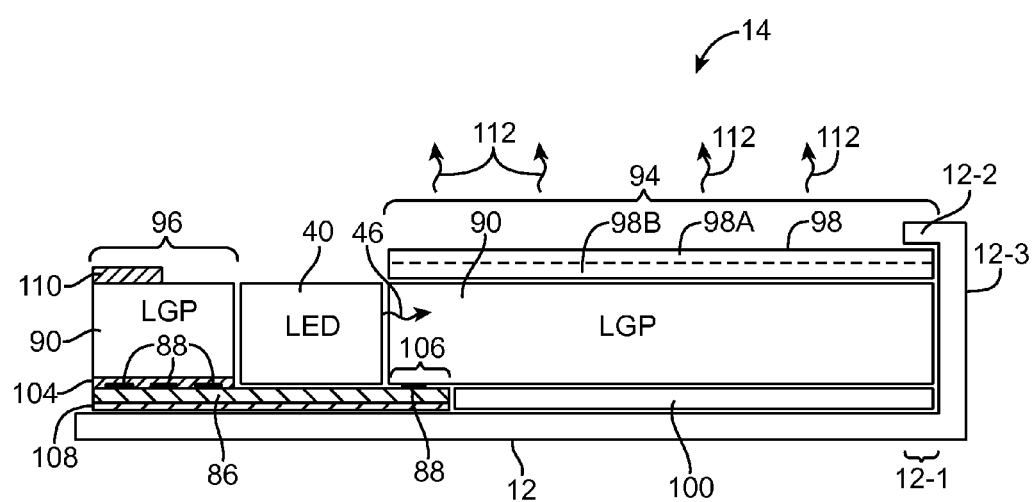
FIG. 9 is a side view of an illustrative electronic device in which a display having a light guide plate of the type shown in FIG. 8 has been mounted in accordance with an embodiment of the present invention.

The presence of edge portion 96 of light guide plate 90 (which is attached to main portion 94 by the material that is interposed between adjacent holes 92) may facilitate attachment of the left-hand edge of light guide plate 90 to the housing of device 10 without the need to use adhesive 82 of FIG. 7 or bezel structures 68 of FIG. 6. As shown in FIG. 9, portion 96 of light guide plate 90 may be attached to flex circuit substrate 86 using adhesive 104.

Light-emitting diode packages 40 may be soldered or otherwise mounted to flex circuit substrate 86, so that light 46 can be emitted into portion 94 of light guide plate 90. Flex circuit substrate 86 may be mounted to housing 12 using adhesive 108. Because flex circuit substrate 86 is attached to housing 12 (e.g., a planar rear housing wall portion of housing 12), light guide plate portion 96 can be securely mounted to housing 12 by attaching portion 96 to flex circuit substrate 86 with the adhesive (adhesive 104) that is interposed between portion 96 and flex circuit substrate 86. Portion 106 of flex circuit substrate 86 need not be covered with adhesive. As a result, the likelihood that light 46 from packaged light-emitting diode 40 will be adversely affected by adhesive and other structures in the vicinity of portion 106 will be reduced and the quality of backlight 112 that is emitted from light guide plate 90 in region 94 can be enhanced.

Reflector 100 may help increase the amount of light 112 that is emitted from light guide plate 90. Reflector 100 may be formed from a reflective material such as white polyester (as an example). Reflector 100 may, as an example, have a thickness of about 0.1 mm to about 0.2 mm. Backlight 112 may pass through display structures 98. Display structures 98 may include an array of image pixel structures such as liquid crystal display (LCD) image pixels. In an LCD display, display structures 98 may include layers such as thin-film transistor layer 98B that includes an array of thin-film transistors for controlling LCD image pixels, a corresponding color filter array layer such as layer 98A that includes an array of colored filter element for providing display 14 with color imaging capabilities, a layer of interposed liquid crystal material between layers 98A and 98B, and other optical films (e.g., diffusers, polarizers, etc.). Display structures 98 may use LCD technology or may use alternative display technologies. Touch screen functions may be included in display structures 98 of display 14 (e.g., by including a layer of transparent capacitor electrodes to form a capacitive touch sensor array).

Conductive traces 88 may be used to route power signals to the light-emitting diodes in packages 40. Traces 88 may be uncovered with adhesive in region 106 of flex circuit substrate 86, which may help prevent light scattering due to the presence of traces 88 in region 106. In region 96 of flex circuit substrate 86, adhesive 104 may be interposed between flex circuit substrate 86 (and its associated traces 88) and the lower surface of portion 96 of light guide panel. Light 46 is not emitted into this region, so the presence of adhesive 104 and traces 88 under region 96 will not affect the quality of backlight 112.

If desired, housing 12 may have a groove such as groove 12-1 that is formed by housing structures such as sidewall structure 12-3 and housing lip structure 12-2. Groove 12-1 may be use to hold light guide plate 90 in place within housing 12 along the right-hand edge of light guide plate 90 (in the orientation of FIG. 9). Adhesive 104 (and optionally additional adhesive such as adhesive 110 on the upper surface of region 96 of light guide plate 90) may also be used in mounting display 14 within housing 12 if desired.

Figure 10:
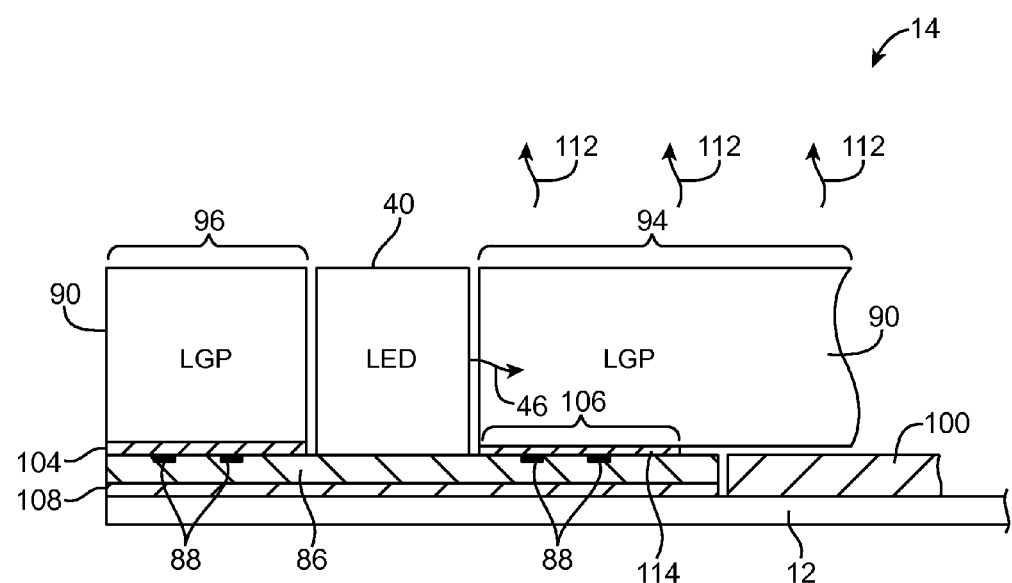
FIG. 10 is a side view of an illustrative display in an electronic device in which a strip of ancillary reflective material has been mounted under a portion of a light guide plate to prevent underlying substrate material from adversely affecting backlight quality in accordance with an embodiment of the present invention.
Figure 11:
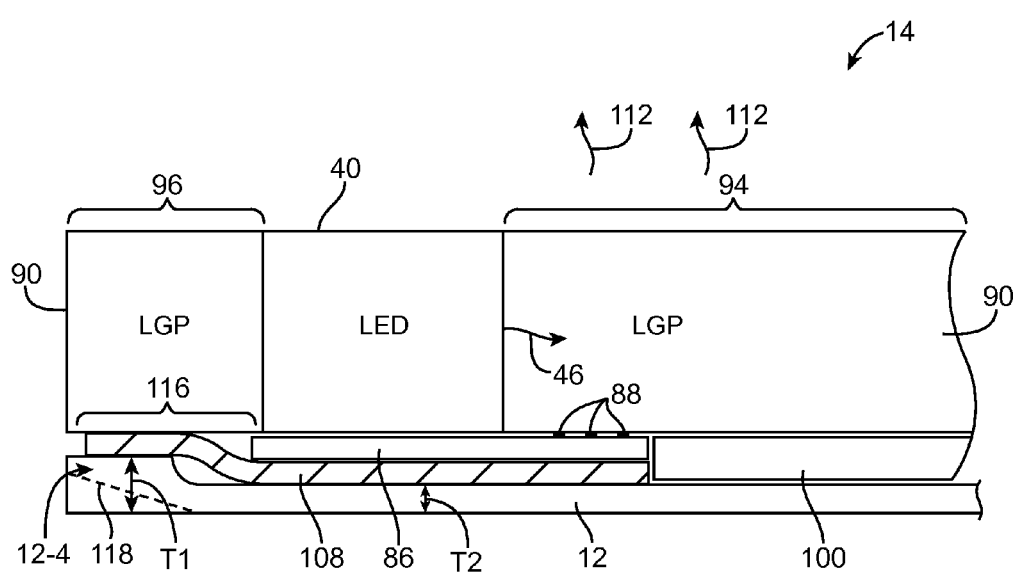
FIG. 11 is a side view of an illustrative display that has been mounted in a housing of an electronic device in a configuration in which flex circuit substrate material for a light-emitting diode array does not extend under the outermost edge portion of a light guide plate in accordance with an embodiment of the present invention.

Another illustrative arrangement that may be used for display 14 of FIG. 1 is shown in FIG. 10. In the arrangement of FIG. 10, portion 106 of flex circuit substrate 86 has been covered with reflective structure 114. Structure 114 may be, for example, a strip of reflective material (e.g., a sheet of white polyester having a thickness of about 0.03 to 0.07 mm). If desired, a layer of white ink may be deposited on flex circuit substrate 86 to serve as structure 114. Structure 114 may reflect light 46 that has been emitted from packaged light-emitting diode 40 and therefore serves as an extension to reflector 100. Because reflective structure 114 helps prevent light from reaching traces 88 in portion 106 of flex circuit substrate 86, reflective structure 114 can reduce light scattering from traces 88 and can enhance the quality of backlight 112. FIG. 11 is a side view of display 14 showing how a single layer of adhesive (portion 116 of adhesive layer 108) may be interposed between edge portion 96 of light guide plate 90 and housing 12. In this type of arrangement, flex circuit substrate 86 does not extend under edge portion 96 (or at least not all of edge portion 96), so portion 96 can be attached directly to housing 12 by adhesive portion 116. To accommodate the thickness of flex circuit substrate 86 and reflector 100, housing 12 may be provided with a protrusion such as protrusion 12-4. Due to the presence of protrusion 12-4 or other structures that raise the height of housing 12 in the vicinity of light guide plate portion 96, housing 12 may, as an example, have a thickness T1 that is larger under light guide plate region 96 than housing thickness T2 under light-emitting diode package 40. If desired, housing 12 may have a curved shape (e.g., for providing housing 12 with an eased edge), as illustrated by dashed line 118 in FIG. 11. The presence of portion 12-4 of housing 12 may facilitate the formation of thickened dimension T1 and/or curved housing edge 118 in device 10.

To ensure that light guide panel 90 is sufficiently strong in the vicinity of holes 92, it may be desirable to ensure that the regions of light guide panel 90 between adjacent holes 92 are sufficiently large. If holes 92 are too numerous and are too close to each other, the amount of material that remains in the regions interposed between adjoining holes 92 will be relatively small, which might make light guide plate 90 too flexile and therefore too weak along its edge. One way to reduce the size of holes 92 involves minimizing the number and size of the light-emitting diodes that are used to form the backlight illumination. When fewer light-emitting diodes are included in display 14, there is a reduced need for holes 92. When weaker light-emitting diodes are used, the size of the required packaging for each diodes may be reduced and the size for holes 92 can be corresponding reduced. In general, either or both of these approaches may be used to ensure that light guide plate 90 is not excessively weakened in the vicinity of holes 92.

Another way in which to ensure that light guide plate 90 is not overly weakened due to the presence of holes 92 involves packaging multiple light-emitting diodes into each SMT package without proportionally increasing the package size. For example, a pair of light-emitting diodes may be incorporated into a package such as package 48 of FIG. 4 in which the length of the package is less than twice the length of a comparable package for a single light-emitting diode.

Figure 12:
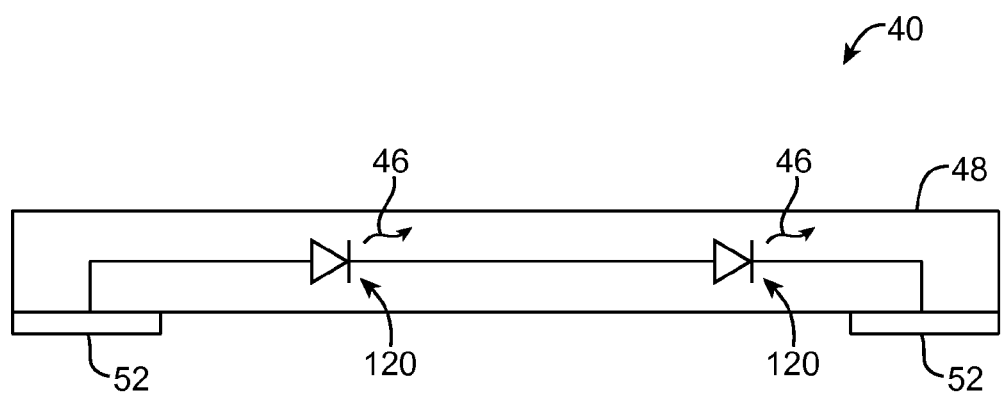
FIG. 12 is a side view of an illustrative surface mount technology package in which a pair of light-emitting diodes has been mounted for launching backlight into a light guide plate in a backlight structure in accordance with an embodiment of the present invention.

FIG. 12 is a side view of a light-emitting diode package arrangement that is being used to accommodate multiple light-emitting diodes. In the example of FIG. 12, light-emitting diode package 40 contains a pair of diodes 120 connected in series between terminals 52. A parallel configuration may be used for diodes 120 if desired.

Figure 13:
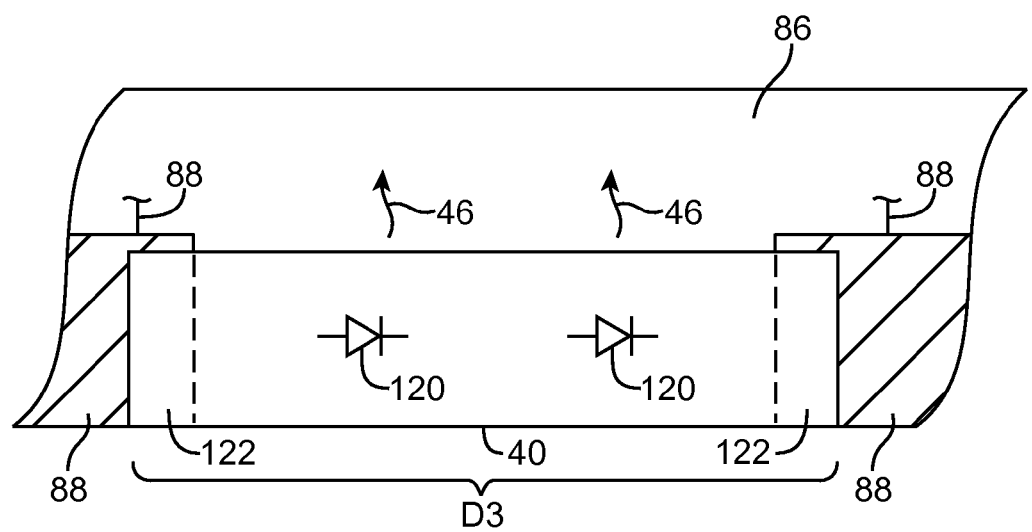
FIG. 13 is a top view of a packaged pair of light-emitting diodes mounted to pad-shaped traces on a flexible printed circuit substrate for a backlight structure in a display in accordance with an embodiment of the present invention.

FIG. 13 is a top view of this type of light-emitting diode package 40 mounted onto pads (traces 88) on flex circuit substrate 86. The length D3 of package 40 of FIG. 13 (i.e., the longer dimension of package structure 48 of FIG. 4) may be less than twice the dimension D1 of conventional diode 24 of FIG. 2 in a configuration where each light-emitting diode 120 has a strength equal to the strength of the single conventional light-emitting diode packaged within conventional package 24 of FIG. 2.

Figure 14:
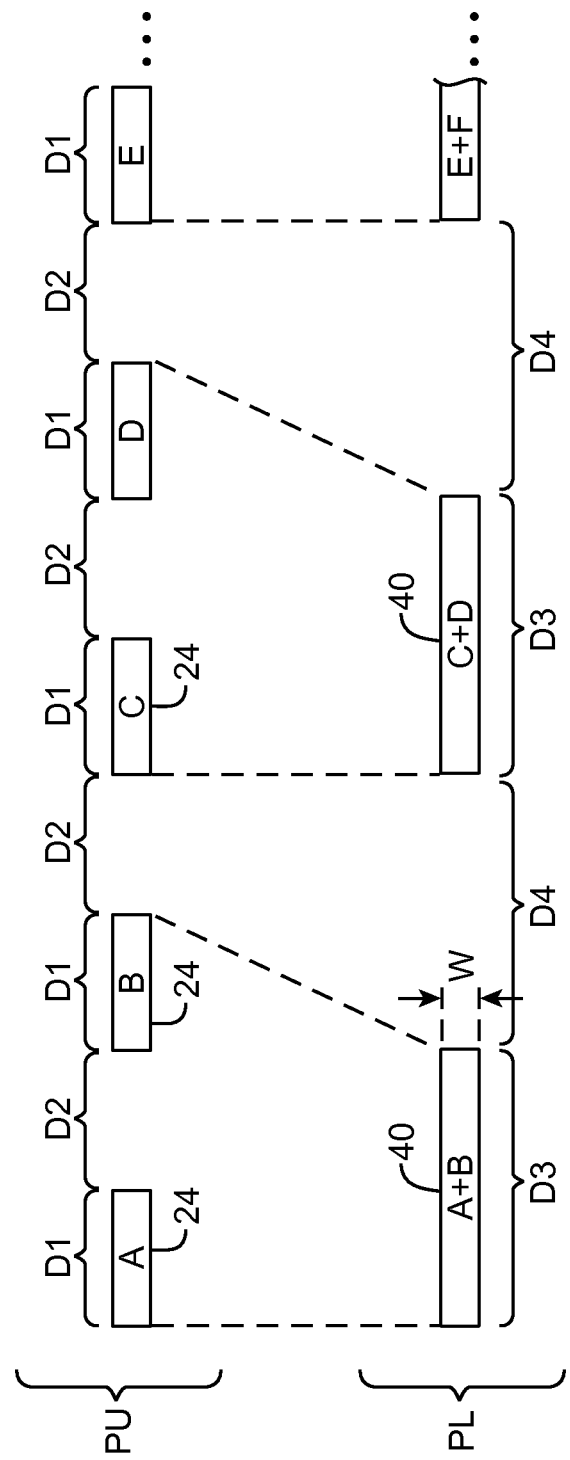
FIG. 14 is a diagram comparing layouts of two different light-emitting diode arrays for backlight structures in accordance with an embodiment of the present invention.

FIG. 14 is a diagram showing how linear packaging space may be conserved by packaging a given type of light-emitting diode into packages in pairs rather than individually. Light-emitting diode array PU of FIG. 14 is formed from a row of conventional packaged light-emitting diodes 24. Diode packages 24 each contain one light-emitting diode of a given strength. Light-emitting diode array PL of FIG. 14 contains is formed from a row of double-diode packages 40. Each light-emitting diode package 40 in diode array PL of FIG. 14 contains two light-emitting diodes 120 each of which as the same given strength as the conventional diode packaged into each of packages 24 in array PU.

Each of packages 24 has a length D1 of 2.8 mm and is separated by a distance D2 of 2.6 mm to ensure that an adequate amount of heat can be dissipated from pads 56.

Each of packages 40 includes two diodes 120. For example, instead of packaging diodes A and B in respective individual packages 24, diodes A and B can be packaged within a shared package 40. Diodes C and D can likewise be packaged in a common SMT package 40 rather than being packaged in respective individual packages 24 as in diode array PU. Due to packaging efficiencies, the length D3 of each package 40 can be less than twice the length of each package 24. In particular, D3 may be about 4.2 mm (as an example), which is less than 5.6 mm (2×2.8 mm). Distance D4 may be selected so that the linear density of light-emitting diodes 120 is the same in the array of portion PL as in the array of portion PU (i.e., distance D4 may be 6.6 mm in this example).

The example of FIG. 14 shows that efficiencies may be created by packaging multiple light-emitting diodes in each package that allow for expanded gaps between adjacent holes 92. In diode array PU, there are gaps of 2.6 mm between each pair of adjacent diode packages, whereas the arrangement of array PL allows gap size to be increased to 6.6 mm without changing the amount of light emitted per unit length. Although there are more gaps of length D2 per unit length in the arrangement of portion PU than there are gaps of length D4 per unit length in the arrangement of portion PU, there is more light guide plate material per unit length with the arrangement of portion PL (6.6 compared to 5.2), enhancing the strength of light guide plate 90 in the vicinity of holes 92.

It is not necessary to configure dimensions D3 and D4 and the sizes and strengths of the light emitting diodes so that display 14 uses an array PL that has the same backlight intensity per unit length as array PU. The comparison of FIG. 14 is presented to demonstrate the efficiencies that are produced when packaging multiple light-emitting diodes in a shared package. Smaller or larger packages, more or fewer light-emitting diodes, stronger or weaker light-emitting diodes, and different magnitudes for dimensions D3 and D4 may be used if desired.

To accommodate a layout of the type described in connection with diode array PL of FIG. 14, holes 92 may each have a length of 4.2 mm or more (to accommodate the length D3 of packages 40) and may be separated by a distance D4 of about 6.6 mm or less. The width W of each package 40 and therefore the width of each hole 92 may be about 2.5 mm (as an example). Other hole configurations may be used in light guide plate 90 if desired. For example, holes 92 may each be about 12 mm in length and 2.5 mm in width and may be separated by gaps of 2.5 mm (as an example). Light-emitting diode packages 40 may be arranged on substrate 86 so as to accommodate this layout of holes 92 in light guide plate 90. Other configurations for holes 92 and packaged light-emitting diodes 40 may be used if desired. These are merely illustrative configurations.

The foregoing is merely illustrative of the principles of this invention and various modifications can be made by those skilled in the art without departing from the scope and spirit of the invention.

What is claimed is:

1. A display, comprising:
   display structures;
   a light guide plate having a plurality of holes each of which is surrounded by portions of the light guide plate;
   light-emitting diodes mounted within the holes, wherein the light-emitting diodes emit backlight for the display structures into the light guide plate;
   a substrate on which the light-emitting diodes are mounted, wherein the substrate is disposed along a first portion of the light guide plate;
   a first reflector disposed along a second portion of the light guide plate, wherein an edge of the first reflector is disposed adjacent to an edge of the substrate, and wherein the first reflector does not overlap the substrate; and
   a second reflector interposed between the light guide plate and at least a portion of the substrate, wherein the second reflector is separate from the first reflector.

2. The display defined in claim 1 wherein the display structures include a thin-film transistor layer and a color filter layer.

3. The display defined in claim 1 wherein the holes comprise holes arranged in a row parallel to an edge of the light guide plate.

4. The display defined in claim 1 wherein the light-emitting diodes are mounted in pairs within packages.

5. The display defined in claim 4 wherein the packages each have a pair of terminals, wherein two light-emitting diodes are connected in series between the pair of terminals in each package, and wherein the terminals are connected to the substrate.

6. The display defined in claim 1 wherein the substrate comprises a flex circuit.

7. The display defined in claim 6 further comprising traces on the flex circuit, wherein the second reflector comprises a strip of reflective material that is adjacent to the traces, wherein no adhesive is interposed between the strip of reflective material and the traces.

8. The display defined in claim 1 wherein the light-emitting diodes in the holes separate an edge portion of the light guide plate on a peripheral side of the holes from a main portion of the light guide plate, the display further comprising a layer of adhesive on a lower surface of the edge portion.

9. The display defined in claim 8, wherein the display is mounted within an electronic device housing, wherein the layer of adhesive is attached to the housing, and wherein the display further comprises a reflector under the light guide plate.

10. The display defined in claim 9 further comprising a flex circuit, wherein the light-emitting diodes are mounted to the flex circuit, wherein the main portion of the light guide plate covers the at least some of the flex circuit, and wherein there is no interposed adhesive between the main portion of the light guide plate and the flex circuit.

11. The display defined in claim 8, wherein the adhesive attaches the edge portion of the light guide plate to the substrate.

12. The display defined in claim 11, wherein the display is mounted within an electronic device housing, wherein the display further comprises an additional layer of adhesive that attaches a lower surface of the substrate to the housing.

13. The display defined in claim 12 wherein the substrate comprises a flex circuit and wherein portions of the light guide plate are mounted within a groove in the electronic device housing.

14. Display structures, comprising:
   a light guide plate having holes each of which has edges and each of which is surrounded on all of its edges by portions of the light guide plate, wherein the light guide plate comprises a first portion directly beneath an active area of the display structures and a second portion not directly beneath the active area of the display structures; and
   a flex circuit on which a row of light-emitting diodes are mounted, wherein each of the light-emitting diodes is received within a respective one of the holes, wherein the row of light-emitting diodes is configured to direct light into the first portion of the light guide plate, wherein the flex circuit comprises one or more conductive traces configured to provide power to the row of light-emitting diodes, and wherein the one or more conductive traces are disposed alongside the row of light-emitting diodes, but not between each light-emitting diode of the row of light-emitting diodes;
   a first reflector disposed along the first portion of the light guide plate, wherein an edge of the first reflector is disposed adjacent to an edge of the flex circuit, and wherein the first reflector does not overlap the flex circuit; and
   a second reflector interposed between the light guide plate and at least a portion of the flex circuit, wherein the second reflector is separate from the first reflector.

15. The display structures defined in claim 14 wherein the first portion of the light guide plate overlaps a first one or more of the one or more conductive traces underneath the first portion, and the second portion of the light guide plate overlaps a second one or more of the one or more conductive traces underneath the second portion, and wherein no adhesive is interposed between the first one or more of the one or more conductive traces and the first portion of the light guide plate.

16. The display structures defined in claim 15, comprising a layer of adhesive interposed between the second portion of the light guide plate and the second one or more of the one or more conductive traces.

17. An electronic device, comprising:
   display structures including a thin-film transistor layer and a color filter array layer;
   a backlight structure that produces backlight that passes through the display structures, wherein the backlight structure includes a light guide plate with holes and light-emitting diodes that are received within the holes;
   a substrate on which the light-emitting diodes are mounted, wherein the substrate is disposed along a first portion of the light guide plate;
   a first reflector disposed along a second portion of the light guide plate, wherein an edge of the first reflector is disposed adjacent to an edge of the substrate, and wherein the first reflector does not overlap the substrate; and
   a second reflector interposed between the light guide plate and at least a portion of the substrate, wherein the second reflector is separate from the first reflector.

18. The electronic device defined in claim 17 wherein the light guide plate includes an edge portion, wherein at least some of the edge portion is separated from a central portion of the light guide plate by one of the holes and wherein the electronic device further comprises adhesive connected to the edge portion.

19. The electronic device defined in claim 18 further comprising a housing, wherein the adhesive is connected to the housing.

20. The electronic device defined in claim 17 wherein the substrate comprises a flex circuit having conductive traces, wherein the light-emitting diodes comprise an array of surface mount technology packages that are mounted in a row along the flex circuit, and wherein the light guide plate overlaps the traces, and wherein there is no adhesive interposed between the flex circuit and the light guide plate where the light guide plate overlaps the traces.

21. The electronic device defined in claim 20 wherein the second reflector is interposed between the flex circuit and the light guide plate where the light guide plate overlaps the traces.

22. The electronic device defined in claim 20 wherein each of the surface mount technology packages includes two of the light-emitting diodes.

* * * * *